(12) United States Patent
Dawson (10) Patent No.: US 7,530,084 B2
(45) Date of Patent: May 5, 2009

(54) METHOD AND APPARATUS FOR SYNCHRONIZING DYNAMIC GRAPHICS

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1359 days.

(21) Appl. No.: 10/156,907

(22) Filed: May 28, 2002

(65) Prior Publication Data

US 2003/0222994 A1 Dec. 4, 2003

(51) Int. Cl.
  H04N 7/16 (2006.01)
  H04N 7/173 (2006.01)
  H04N 7/167 (2006.01)
  G09G 5/00 (2006.01)
  H04N 5/93 (2006.01)
  H04N 5/04 (2006.01)

(52) U.S. Cl. ............ 725/25; 725/86; 725/104; 380/201; 380/217; 345/629; 386/61; 348/511

(58) Field of Classification Search ............ 725/25, 725/86, 104; 380/201, 217; 345/629; 386/61; 348/511

See application file for complete search history.

(56) References Cited

U.S. PATENT DOCUMENTS

| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |

(Continued)

FOREIGN PATENT DOCUMENTS

EP 0471373 2/1992

(Continued)

OTHER PUBLICATIONS

Webpopedia, P-frame, I-frame, B-frame, last modified Jan. 22, 2004, http://www.webopedia,com/TERM/P/P_frame.html, http://www.webopedia.com/TERM/I/I_frame.html, http://www.webopedia.com/TERM/B/B_frame.html.*

(Continued)

*Primary Examiner*—Hoang-Vu A Nguyen-Ba
(74) *Attorney, Agent, or Firm*—John L. Rogitz (57) ABSTRACT

An apparatus and a method for overlaying parts of a displayed presentation of a video by using graphic content rendered by a receiving device such as a set top box or television to complete a displayed presentation of the video. The apparatus receiving frame synchronizing information from a content provider and then conveying the frame synchronizing information as a graphic overlay to the video. The frame synchronizing information comprises frame starting identifier data, frame ending identifier and positional information for describing frame locations and frame timing for overlaying the graphic content and positional information to indicate where to place the graphic content to be overlaid. The frame synchronizing information provides the information necessary to place graphic content, such as a graphic image or graphic animation, at specified positions that are synchronized to the displayed presentation. The same method also enables audio information to be synchronized. The graphic content supplied may include a block of pixel data, an image, an animation or an audio clip.

23 Claims, 4 Drawing Sheets

U.S. PATENT DOCUMENTS

| | | |
|---|---|---|
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams et al. ............... 713/153 |
| 5,455,862 A | 10/1995 | Hoskinson ................... 380/21 |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,550,575 A * | 8/1996 | West et al. .................... 725/28 |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,335 A * | 5/1998 | Shintani ...................... 725/25 |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A * | 4/2000 | Spies et al. ................. 380/228 |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. ........... 370/240 |

| | | | |
|---|---|---|---|
| 6,061,451 A | 5/2000 | Muratani et al. | |
| 6,064,748 A | 5/2000 | Hogan | |
| 6,065,050 A | 5/2000 | DeMoney | |
| 6,069,647 A | 5/2000 | Sullivan et al. | |
| 6,070,245 A | 5/2000 | Murphy, Jr. et al. | |
| 6,072,872 A | 6/2000 | Chang et al. | |
| 6,072,873 A | 6/2000 | Bewick | |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,821 A | 9/2000 | Newby et al. | |
| 6,118,873 A | 9/2000 | Lotspiech et al. | |
| 6,134,551 A | 10/2000 | Aucsmith | |
| 6,148,082 A | 11/2000 | Slattery et al. | |
| 6,154,206 A | 11/2000 | Ludtke | |
| 6,157,719 A | 12/2000 | Wasilewski et al. | |
| 6,181,334 B1 | 1/2001 | Freeman et al. | |
| 6,185,369 B1 | 2/2001 | Ko et al. | |
| 6,185,546 B1 | 2/2001 | Davis | |
| 6,189,096 B1 | 2/2001 | Haverty | |
| 6,192,131 B1 | 2/2001 | Geer et al. | |
| 6,199,053 B1 | 3/2001 | Herbert et al. | |
| 6,204,843 B1 | 3/2001 | Freeman et al. | |
| 6,209,098 B1 | 3/2001 | Davis | |
| 6,215,484 B1 | 4/2001 | Freeman et al. | |
| 6,226,618 B1 | 5/2001 | Downs | |
| 6,229,895 B1 | 5/2001 | Son et al. | |
| 6,230,194 B1 | 5/2001 | Frailong et al. | |
| 6,230,266 B1 | 5/2001 | Perlman et al. | |
| 6,236,727 B1 | 5/2001 | Ciacelli et al. | |
| 6,240,553 B1 | 5/2001 | Son et al. | |
| 6,246,720 B1 | 6/2001 | Kutner et al. | |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 * | 7/2001 | Ezaki et al. | 386/94 |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Atkins, III et al. | |
| 6,292,892 B1 | 9/2001 | Davis | |
| 6,307,939 B1 | 10/2001 | Vigarie | |
| 6,311,012 B1 | 10/2001 | Cho et al. | |
| 6,314,569 B1 * | 11/2001 | Chernock et al. | 725/37 |
| 6,324,288 B1 | 11/2001 | Hoffman | |
| 6,351,538 B1 | 2/2002 | Uz | |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | |
| 6,415,101 B1 | 7/2002 | deCarmo et al. | |
| 6,430,361 B2 | 8/2002 | Lee | |
| 6,445,738 B1 | 9/2002 | Zdepski et al. | |
| 6,449,718 B1 | 9/2002 | Rucklidge et al. | |
| 6,453,115 B1 | 9/2002 | Boyle | |
| 6,459,427 B1 | 10/2002 | Mao et al. | |
| 6,463,152 B1 | 10/2002 | Takahashi | |
| 6,466,671 B1 | 10/2002 | Maillard et al. | |
| 6,505,032 B1 | 1/2003 | McCorkle et al. | |
| 6,505,299 B1 | 1/2003 | Zeng et al. | |
| 6,510,554 B1 | 1/2003 | Gorden et al. | |
| 6,519,693 B1 | 2/2003 | Debey | |
| 6,529,526 B1 | 3/2003 | Schneidewend | |
| 6,543,053 B1 | 4/2003 | Li et al. | |
| 6,549,229 B1 | 4/2003 | Kirby et al. | |
| 6,557,031 B1 | 4/2003 | Mimura et al. | 790/218 |
| 6,587,561 B1 | 7/2003 | Sered et al. | |
| 6,640,145 B2 | 10/2003 | Hoffberg et al. | |
| 6,650,754 B2 | 11/2003 | Akiyama et al. | |
| 6,654,389 B1 | 11/2003 | Brunheroto et al. | 370/535 |
| 6,678,740 B1 | 1/2004 | Rakib et al. | |
| 6,681,326 B2 | 1/2004 | Son et al. | |
| 6,684,250 B2 | 1/2004 | Anderson et al. | |
| 6,697,944 B1 | 2/2004 | Jones et al. | |
| 6,714,650 B1 | 3/2004 | Maillard et al. | |
| 6,754,276 B1 | 6/2004 | Harumoto et al. | |
| 6,772,340 B1 | 8/2004 | Peinado et al. | 713/168 |
| 6,788,690 B2 | 9/2004 | Harri | |
| 6,826,185 B1 | 11/2004 | Montanaro et al. | |
| 6,859,335 B1 | 2/2005 | Lai et al. | 359/800 |
| 6,891,565 B1 | 5/2005 | Dietrich | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,938,162 B1 | 8/2005 | Nagai et al. | |
| 6,976,166 B2 | 12/2005 | Herley et al. | |
| 7,065,213 B2 | 6/2006 | Pinder | |
| 7,076,064 B2 * | 7/2006 | Relander et al. | 380/247 |
| 7,127,619 B2 | 10/2006 | Unger et al. | |
| 2001/0030959 A1 | 10/2001 | Ozawa et al. | |
| 2001/0036271 A1 | 11/2001 | Javed | |
| 2001/0051007 A1 | 12/2001 | Teshima | |
| 2002/0003881 A1 | 1/2002 | Reitmeier et al. | |
| 2002/0026587 A1 | 2/2002 | Talstra et al. | |
| 2002/0046406 A1 | 4/2002 | Chelehmal et al. | |
| 2002/0047915 A1 | 4/2002 | Misu | |
| 2002/0059425 A1 | 5/2002 | Belfiore et al. | |
| 2002/0083317 A1 | 6/2002 | Ohta et al. | |
| 2002/0083438 A1 | 6/2002 | So et al. | |
| 2002/0097322 A1 | 7/2002 | Monroe et al. | |
| 2002/0108035 A1 | 8/2002 | Herley et al. | |
| 2002/0116705 A1 | 8/2002 | Perlman et al. | |
| 2002/0126890 A1 | 9/2002 | Katayama et al. | |
| 2002/0129243 A1 | 9/2002 | Nanjundiah | |
| 2002/0164022 A1 | 11/2002 | Strasser et al. | |
| 2002/0170053 A1 | 11/2002 | Peterka et al. | |
| 2002/0184506 A1 | 12/2002 | Perlman | |
| 2002/0194613 A1 | 12/2002 | Unger | 725/118 |
| 2002/0196939 A1 | 12/2002 | Unger et al. | |
| 2003/0002854 A1 | 1/2003 | Belknap et al. | |
| 2003/0009669 A1 | 1/2003 | White et al. | |
| 2003/0021412 A1 | 1/2003 | Candelore et al. | |
| 2003/0026423 A1 | 2/2003 | Unger | 380/217 |
| 2003/0031172 A1 | 2/2003 | Grinfeld | 370/389 |
| 2003/0046686 A1 | 3/2003 | Candelore et al. | |
| 2003/0059047 A1 | 3/2003 | Iwamura | |
| 2003/0063615 A1 | 4/2003 | Luoma et al. | |
| 2003/0072555 A1 | 4/2003 | Yap et al. | |
| 2003/0077071 A1 | 4/2003 | Lin et al. | |
| 2003/0081630 A1 | 5/2003 | Mowery et al. | |
| 2003/0081776 A1 | 5/2003 | Candelore | |
| 2003/0084284 A1 | 5/2003 | Ando et al. | |
| 2003/0097662 A1 | 5/2003 | Russ et al. | |
| 2003/0112333 A1 | 6/2003 | Chen et al. | |
| 2003/0118243 A1 | 6/2003 | Sezer et al. | |
| 2003/0123664 A1 | 7/2003 | Pedlow | 380/218 |
| 2003/0123849 A1 | 7/2003 | Nallur et al. | |
| 2003/0126086 A1 | 7/2003 | Safadi | |
| 2003/0133570 A1 | 7/2003 | Candelore | 380/210 |
| 2003/0140257 A1 | 7/2003 | Peterka et al. | |
| 2003/0145329 A1 | 7/2003 | Candelore | |
| 2003/0152224 A1 | 8/2003 | Candelore | 380/210 |
| 2003/0152226 A1 | 8/2003 | Candelore et al. | |
| 2003/0156718 A1 | 8/2003 | Candelore | 380/212 |
| 2003/0159139 A1 | 8/2003 | Candelore | 380/217 |
| 2003/0159140 A1 | 8/2003 | Candelore | 380/210 |
| 2003/0159152 A1 | 8/2003 | Lin et al. | |
| 2003/0174837 A1 | 9/2003 | Candelore | 725/32 |
| 2003/0188154 A1 | 10/2003 | Dallard | |
| 2003/0193973 A1 | 10/2003 | Takashimizu et al. | |
| 2003/0198223 A1 | 10/2003 | Mack et al. | |
| 2003/0204717 A1 | 10/2003 | Kuehnel | |
| 2003/0226149 A1 | 12/2003 | Chun et al. | |
| 2003/0228018 A1 | 12/2003 | Vince | |
| 2004/0003008 A1 | 1/2004 | Wasilewski et al. | |

| | | | |
|---|---|---|---|
| 2004/0010717 A1 | 1/2004 | Simec et al. | |
| 2004/0021764 A1 | 2/2004 | Driscoll, Jr. et al. | |
| 2004/0028227 A1 | 2/2004 | Yu | |
| 2004/0047470 A1 | 3/2004 | Candelore | 380/240 |
| 2004/0049688 A1 | 3/2004 | Candelore | 380/28 |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0078575 A1 | 4/2004 | Morten et al. | |
| 2004/0081333 A1 | 4/2004 | Grab et al. | |
| 2004/0091109 A1 | 5/2004 | Son et al. | |
| 2004/0100510 A1 | 5/2004 | Milic-Frayling et al. | |
| 2004/0123094 A1 | 6/2004 | Sprunk | 713/193 |
| 2004/0136532 A1 | 7/2004 | Pinder et al. | |
| 2004/0139337 A1 | 7/2004 | Pinder et al. | 713/189 |
| 2004/0165586 A1 | 8/2004 | Read et al. | |
| 2004/0187161 A1 | 9/2004 | Cao | 725/110 |
| 2004/0193550 A1 | 9/2004 | Siegel | |
| 2004/0240668 A1 | 12/2004 | Bonan | 380/240 |
| 2004/0267602 A1 | 12/2004 | Gaydos et al. | |
| 2005/0004875 A1 | 1/2005 | Kontio et al. | |
| 2005/0028193 A1 | 2/2005 | Candelore | 725/32 |
| 2005/0036067 A1 | 2/2005 | Ryal | 382/284 |
| 2005/0066357 A1 | 3/2005 | Ryal | 725/28 |
| 2005/0071669 A1 | 3/2005 | Medvinsky et al. | |
| 2005/0094808 A1 | 5/2005 | Pedlow | 380/210 |
| 2005/0094809 A1 | 5/2005 | Pedlow | 380/210 |
| 2005/0097596 A1 | 5/2005 | Pedlow | 380/200 |
| 2005/0097597 A1 | 5/2005 | Pedlow | 380/211 |
| 2005/0097598 A1 | 5/2005 | Pedlow | 380/211 |
| 2005/0097614 A1 | 5/2005 | Pedlow | 375/240.08 |
| 2005/0102702 A1 | 5/2005 | Candelore | 725/153 |
| 2005/0129233 A1 | 6/2005 | Pedlow | 380/239 |
| 2005/0169473 A1 | 8/2005 | Candelore | 380/239 |
| 2005/0192904 A1 | 9/2005 | Candelore | 705/54 |
| 2005/0259813 A1 | 11/2005 | Wasilewski et al. | 380/28 |
| 2005/0026547 A1 | 12/2005 | Strasser et al. | |
| 2006/0115083 A1 | 6/2006 | Candelore | 380/216 |
| 2006/0126844 A1* | 6/2006 | Mauro | 380/261 |
| 2006/0136976 A1 | 6/2006 | Coupe et al. | |
| 2006/0153379 A1 | 7/2006 | Candelore | 380/216 |
| 2006/0262926 A1 | 11/2006 | Candelore | 380/200 |
| 2006/0269060 A1 | 11/2006 | Candelore | 380/239 |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0833517 | 4/1998 |
| EP | 0866615 | 9/1998 |
| EP | 1187483 | 3/2002 |
| JP | 7067028 | 3/1995 |
| JP | 11243534 | 10/2002 |
| WO | WO 86/07224 | 12/1986 |
| WO | WO 97/38530 | 10/1997 |
| WO | WO 00/31964 | 6/2000 |
| WO | WO 01/65762 | 9/2001 |
| WO | WO 01/78386 | 10/2001 |

OTHER PUBLICATIONS

Siddhartha Devadhar, Cederic Krumbein, Kim Man Liu, MPEG Background, retrieved from the Internet on Mar. 1, 2007, http://bmrc.berkeley.edu/research/mpeg/mpeg_overview.html.*
U.S. Appl. No. 11/526,316, filed Sep. 25, 2006, Candelore.
U.S. Appl. No. 10/662,585, filed Sep. 15, 2003, Ryal.
U.S. Appl. No. 11/344,292, filed Jan. 31, 2006, Pedlow.
U.S. Appl. No. 11/365,564, filed Mar. 1, 2006, Candelore.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
Metro Media ™ PVR-DVD-MP3-Web—Internet publication from www.metrolink.com, undated.
"Multimedia and Security Workshop at ACM Multimedia" '98. Bristol, U.K., Sep. 1998.
"Passage™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Visible World—A High Impact Approach to Customized Television Advertising" by Haberman, Dec. 2001.
Anonymous, Message Authentication with Partial Encryption, Research discosure RD 296086, Dec. 10, 1998 McCormac Hack Over Cablemodem, HackWatch, Aug. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia, (Sep. 1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Crytography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY, (Jun. 3, 1993).

"ClearPlay: The Technology of Choice", from web site, ClearPlay 2001-2003.

Zheng Liu, Xue Li; "Motion Vector Encryption in Multimedia Streaming" Proceedings of the 10$^{th}$ International Multimedia Modeling Conference 2004 IEEE.

U.S. Appl. No. 10/038,217, Critical Packet Partial Encryption.
U.S. Appl. No. 10/038,032, Time Division Partial Encryption.
U.S. Appl. No. 10/037,914, Elementary Stream Partial Encryption.
U.S. Appl. No. 10/037,499, Partial Encryption and PID Mapping.
U.S. Appl. No. 10/037,498, Decoding and Decryption of Partially Encrypted Information.
U.S. Appl. No. 11/282,138, Partial Encryption and PID Mapping.
U.S. Appl. No. 11/282,139, Partial Encryption and PID Mapping.
U.S. Appl. No. 10/273,875, Encryption and Content Control in a Digital Broadcast System.
U.S. Appl. No. 10/084,106, Reconstitution of Program Streams Split Across Multiple Program Identifiers.
U.S. Appl. No. 10/273,903, Star Pattern Partial Encryption.
U.S. Appl. No. 10/274,084, Slice Mask and Moat Pattern Partial Encrytpion.
U.S. Appl. No. 10/319,066, Content Replacement by PID Mapping.
U.S. Appl. No. 10/293,761, Upgrading of Encryption.
U.S. Appl. No. 10/318,782, Content Distribution for Multiple Digital Rights Management.
U.S. Appl. No. 11/097,919, Selective Encryption with Coverage Encryption.
U.S. Appl. No. 10/319,169, Selective Encryption to Enable Multiple Decryption Keys.
U.S. Appl. No. 10/273,904, Multiple Partial Encryption Using Retuning.
U.S. Appl. No. 10/391,940, Selective Encryption to Enable Trick Play.
U.S. Appl. No. 10/303,594, Progressive Video Refresh Slice Detection.
U.S. Appl. No. 10/274,019, Video Scene Change Detection.
U.S. Appl. No. 10/393,324, Auxillary Program Association Table.
U.S. Appl. No. 10/767,421, Content Scrambling With Minimal Impact on Legacy Devices.
U.S. Appl. No. 10/662,585, Decryption System.
U.S. Appl. No. 10/667,614, Modifying Content Rating.
U.S. Appl. No. 10/634,546, Variable Perspective View of Video Images.
U.S. Appl. No. 10/822,891, Macro-Block Based Content Replacement by PID Mapping.
U.S. Appl. No. 10/764,202, Re-encrypted Delivery of Video on Demand Content.
U.S. Appl. No. 10/828,737, Batch Mode Session-based Encryption of Video on Demand Content.
U.S. Appl. No. 10/764,011, Bi-Directional Indices for Trick Mode Video-on-Demand.
U.S. Appl. No. 10/802,084, Hybrid Storage of Video on Deamnd Content.
U.S. Appl. No. 10/802,007, Dynamic Composition of Pre-Encrypted Video on Demand Content.
U.S. Appl. No. 10/774,871, Cablecard with Content Manipulation.
U.S. Appl. No. 10/802,008, Preparation of Content for Multiple Conditional Access Methods in Video on Demand.
U.S. Appl. No. 10/823,431, Composite Session-Based Encryption of Video On Demand.
U.S. Appl. No. 10/964,267, Multiple SElective Encryption with DRM.
U.S. Appl. No. 11/344,292, Content Substitution Editor.
U.S. Appl. No. 11/474,625, filed Jun. 26, 2006, Unger.
U.S. Appl. No. 11/474,550, filed Jun. 26, 2006, Candelore et al.
U.S. Appl. No. 11/365,564, filed Mar. 1, 2006, Candelore.
U.S. Appl. No. 11/344,292, filed Jan. 31, 2006, Pedlow, Jr.
U.S. Appl. No. 10/662,585, filed Sep. 15, 2003, Ryal.

"How Networks Work—Millennium Edition" - pp. 88-89, Que Corporation, 2000.

Selective Encryption and MPEG-2, by, T.Lookabaugh, I. Vedula, D. Sicker, published 2000.

* cited by examiner

METHOD AND APPARATUS FOR SYNCHRONIZING DYNAMIC GRAPHICS

I. FIELD OF THE INVENTION

The present invention relates to completing parts of a video plane by overlaying graphic content from the graphics plane onto the video plane, and more specifically synchronizing the graphic content to be overlaid with the particular video plane by using frame identifier information of the chosen video plane.

II. BACKGROUND OF THE INVENTION

Concealing part of video is routinely performed today for a variety of reasons. For example, if a particular part of a video is deemed not suitable for viewing by the public in general, then that part of the video not suitable for viewing is concealed by a blurring operation of the part of the video deemed not suitable. When the video is then viewed, the blurred part of the video would conceal the not suitable material but would still allow the rest of the video content to be viewed.

Sometimes an entire video channel is concealed from viewing by a scrambling operation. This may be done when a monthly access fee is needed to be paid so as to view a subscription channel. If the fee is not paid, then the video is concealed from viewing by scrambling the video channel to render the video un-viewable.

In both of the above examples, the concealing operation is performed by embedding the blurred part of the image of the video into the video signal or by performing a scrambling operation on the channel delivering the video. This concealing operation is performed on the video signal itself prior to being received by the displaying device. There is no method at present to reconstruct the original image at the receiving device.

Other kinds of operations which embed images onto the video include adding out-takes and behind the scenes footage. Again, these kind of additions are added to the video signal prior to it's being received by a receiving device for display. There is no method at present to allow the user to choose whether they wish to enable or disable viewing of this additional material.

SUMMARY OF THE INVENTION

The system of the present invention relates to the location and timing of graphics plane information, or audio information, made available to the user's receiver equipment This information enables the user's receiver equipment to generate and overlay graphic content in an adaptive manner for concurrently required video content. This system also allows the creation of parallel displays of video with and without the overlaid graphic content. Further, the overlay of the graphic content may be performed without altering the original video plane information. The system of the present invention permits the coordination of several kinds of graphic content, for example, graphic content that is not pre-stored, graphic content replacing specific portions of the video, graphic content darkening all but a specific portion of a video plane, and graphic content adding additional information that may activate a link to an internet URL. In addition, secondary audio tracks that have individual sound and volume controls can be expressed with the graphic content.

The dynamic graphic system of the present invention includes an overlaying of at least a portion of a video plane with a graphic plane. The overlaid content enables the displaying of the video plane in tandem with the added graphic content. Moreover, the graphics are generated locally by the receiver, which may be for example a set-top box or the like, to display graphic content comprised of replaced video, additional screen text or animated objects in predetermined locations overlaying the video plane.

In one embodiment, the graphic content overlays the video portions to complete the original video. For example, if the original video is distributed with a portion in the video planes removed and replaced as "floating black bars"; the deleted video associated with the "floating black bars" is overlaid with graphic content containing the video that would normally appear in the area covered by the black bars. Should the user wish to view the complete video, the user pays a fee to get a key to unlock the graphic content to view the entire video.

The additional graphic content is "meta-data" which is transmitted along with the original video. Additionally, for copy protection, the receiving device would not include the feature of having the graphic content overlaid over the video plane in a video output signal to a VCR or other like device. Hence, a complete video cannot be copied.

In a method, the present invention comprises overlaying parts of a displayed presentation from a video signal using graphic content rendered by a receiving device. This embodiment comprises the several steps of receiving the frame synchronizing information from the video file and conveying the frame synchronizing information to the receiving device. Further, the frame synchronizing information can comprise frame starting identifier data, frame ending identifier for describing frame locations, and frame timing for overlaying graphic content and for receiving graphic content from the receiving device. Furthermore, the data received by the display device includes the graphics data to display, the location to display it and which frame, or frames of video need the graphic data applied too. This information matching the graphics content to the video signal is called the frame synchronizing data. The receiving device matches the graphic content with the video signal using the frame synchronizing data. In this way the information shown on the graphics plane are shown synchronized with the displayed video.

It is recognized that the pixel data used for the graphic overlay may be associated with motion vector data. Within digital video, a group of pixels may be simply translated to a new position on the display. That is, while the pixel data itself has not changed the group of pixels has been moved to a new position. This group of static pixels can be extracted from the video and replace with some color, such as black, or pattern. These pixels are then transmitted for display in the graphics overlay plane. The motion vector data is used to describe the starting position of the group of pixels along with where to place the pixel data in subsequent frames. In this manner a single block of pixels may be applied to several frames of video. It is recognized that the receiver may be displaying several different blocks of pixels in the graphics overlay during a single frame of video. This technique represents one possible use of the present invention and shall be interpreted as illustrative and not in a limiting sense.

In another method, the present invention comprises a computer program executable sent by a content provider to a receiving device to overlay a portion or portions of graphic content on a video. Rather than being an integral part of the receiving device, a downloaded executable program from the content provider is used to provide the timed graphic overlay capability. The present invention comprises the steps of receiving graphic content within a receiving device and communicating the graphic content to a graphics plane that is timed to match the video being shown. The graphics content includes frame synchronizing data relating to the displayed video where the frame synchronizing data comprises frame identifier data, motion vector specifications for describing frame locations, and starting and ending frame coordinate data. Further, the synchronizing data is used for overlaying the graphic content from the graphics plane onto the video plane to complete the video plane being viewed by a user. The overlaid portion of the video is defined by the frame identifier data, motion vector specifications, and starting and ending frame coordinate data. Finally, the synchronizing data may be encrypted requiring the receiving device to decode the synchronizing data. Further, enabling or disabling the display of the decoded encrypted data can be determined by a user preference, parental control, a user's age, the payment of a fee or controlled completely by the content provider.

BRIEF DESCRIPTION OF DRAWINGS

For a more complete understanding of the invention, reference is made to the following description and accompanying drawings, in which FIG. 1. is a view of a video plane and graphic plane.

DETAIL DESCRIPTION OF THE PREFERRED EMBODIMENT

Definitions

Included are the following definitions which are set forth and are intended to be used when reviewing the matter contained in the below description and shown in the accompanying drawings to be interpreted as illustrative and not in a limiting sense.

Video—a digital video signal provided from content providers, including but not limited to cable companies, satellite providers and pay per view providers.

Video Channel—a designated frequency for carrying modulated video content.

Video plane—internal hardware device used for the scan out to a display.

Graphic plane—internal hardware device used for graphic overlaying on the video.

Graphic content—the package of information sent from the content provider that specifies data to be overlaid on the displayed video.

Video content—video information intended for display on a display device.

Graphic overlay—graphic plane on the video for display.

Graphic plane information—the current content data of the graphic display plane.

Meta-data—a collection of information that encompasses data transmitted with the video signal. The Meta-data contains information about the video signal and is transmitted separately from the video sent by the content provider. In a typical embodiment the Meta-data will be transmitted in the user data section of a MPEG transport stream.

Video signal—the MPEG 2 video data sent from the content provider.

Graphics Data—data that describes the image to overlay the video.

Frame synchronizing data—the portion of the graphic content that specifies which frame or frames of the video the graphic data is to be supplied too.

Graphic information—same as graphic content.

Displayed video—the visual output of a particular video channel.

Interrupt signal—the signal generated by the audio video decoder to the CPU specifying frame or frames received from a tuner or other front end device.

Detailed Description

Figure 1:
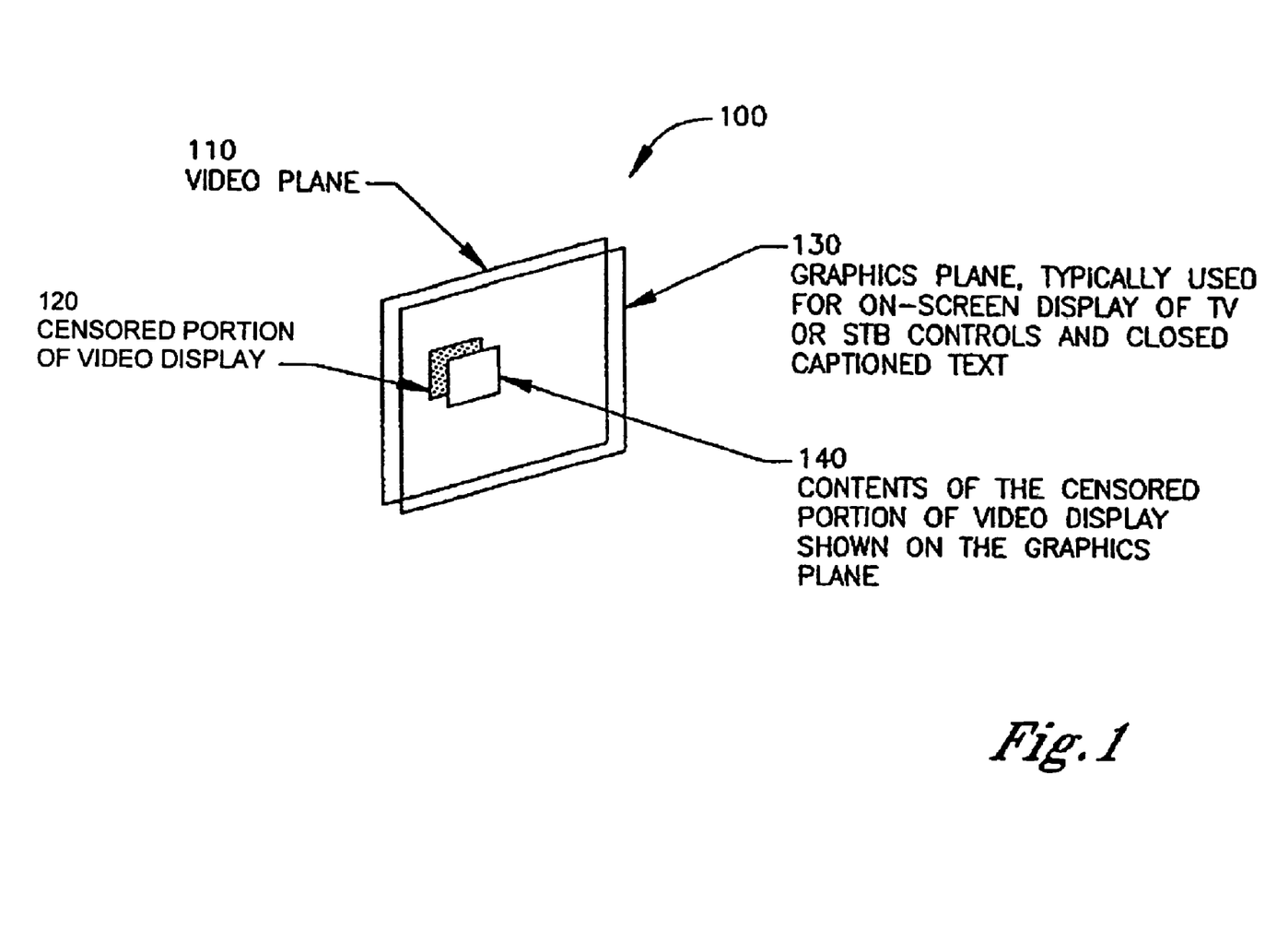

Referring first to FIG. 1, a video plane together with a graphic plane and graphic content is depicted, indicated generally at 100. Video plane 110 is in tandem with graphics plane 130. The position of the censored portion 120 of the video plane is the same as the portion shown on the graphic plane 140. The graphic plane 130 is typically used for on screen displays of television or set top box controls as well as closed captioned text.

In the embodiment shown, the censored portion of the video plane 120 may be overlaid with the appropriate content of the graphics plane 130. The viewer then perceives a complete uncensored video.

Figure 2A:
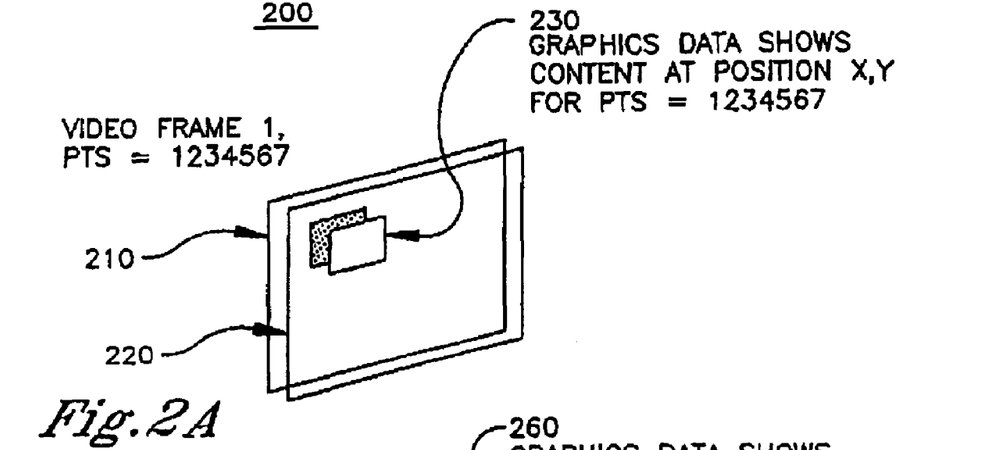
FIGS. 2a-2c are views of the graphic content dynamically moving across the graphic plane thereby restoring the entire video.
Figure 2B:
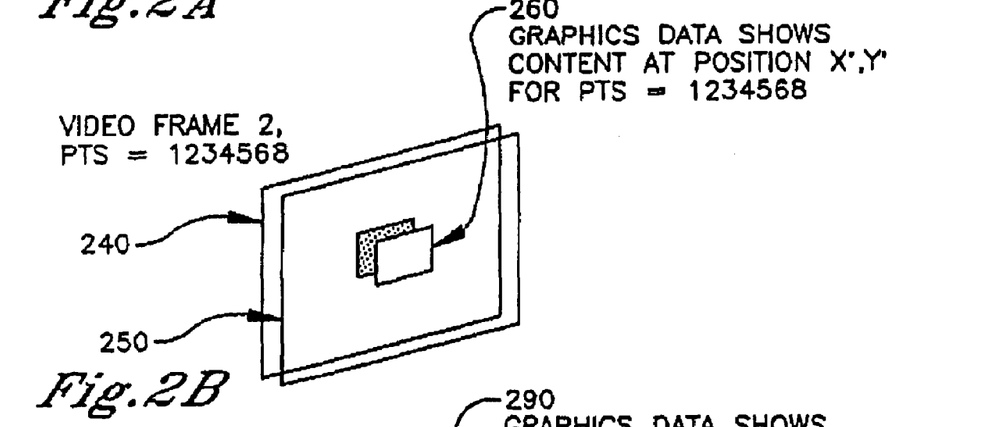
Figure 2C:
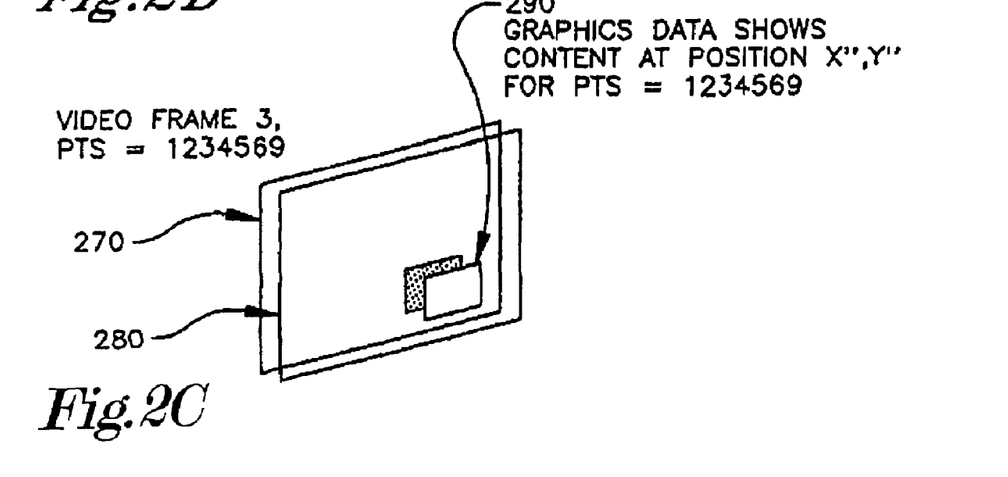

Referring next to FIGS. 2a-c, a positioning of the graphic content in the graphics plane in accordance with the invention is depicted. When using MPEG 2 video, the beginning and ending time for a series of frames are specified in terms of the presentation time stamp (PTS) of the frames. These presentation time stamps are typically present in every frame to every third frame which is sufficient for frame synchronization. The overlaying regions for the graphic content in the frames are specified by coordinates X, Y. As is shown in FIG. 2a, a graphic content 230 located in the graphic plane is positioned at position X, Y with a presentation time stamp of 1234567 of that graphic plane.

Additionally, the matching video plane has a presentation time stamp of 1234567 of its particular frame. Thus, the position of the graphic content in the graphic plane is matched to the video frame 210 in the video plane. This matching operation is performed by matching the presentation time stamp or other frame identifier information of the video frame with that of the graphic frame. Intra-frame positioning is described below, and is consistent with the MPEG standard, the video frames may be an I frame, a B frame or a P frame for digital video.

Also, as noted in FIGS. 2b and 2c, further matching operations are shown in accordance with the invention. For example in FIG. 2b, video frame 2 having a presentation time stamp of 1234568 is matched with graphic content 260 of the graphic plane having a corresponding presentation time stamp of 1234568. Thus the video plane 240 and the graphic plane 250 are both synchronized by bringing together the same presentation time stamps. In FIG. 2c, the video frame 3 having a presentation time stamp of 1234569 of the video plane 270 is matched to graphic plane 280 having graphic content 290. As a result, the graphic plane overlays and dynamically tracks the censored portion of the video plane to create a perception of a complete video program.

During an implementation of the above matching operation, an interrupt is generated from a video decoder signal to a microprocessor when a next frame of video is ready for displaying. Graphic content is initially decoded into a buffer or circular queue slightly ahead of the video such that when a video frame which includes the graphic content is signaled as ready by an interrupt signal, the video is ready for display on the graphic plane. The interrupt signal sent from a video decoder either provides the frame timing information or is set up so that the information is readily available at a predetermined location.

Additionally, each of the graphic contents of the graphic frame in the graphic plane is matched with the video frame in the video plane at positions designated by different X, Y within the video frame. Hence each of the above video frames 1, 2, and 3, each has its corresponding graphic content at a different X, Y location. Therefore, when viewing multiple video frames, the graphic content can be placed at different locations within these multiple video frames. The data being displayed can also vary with each frame. The graphics images being overlaid are not required to be static groups of pixels associated with motion vector data from the MPEG video.

Figure 3:
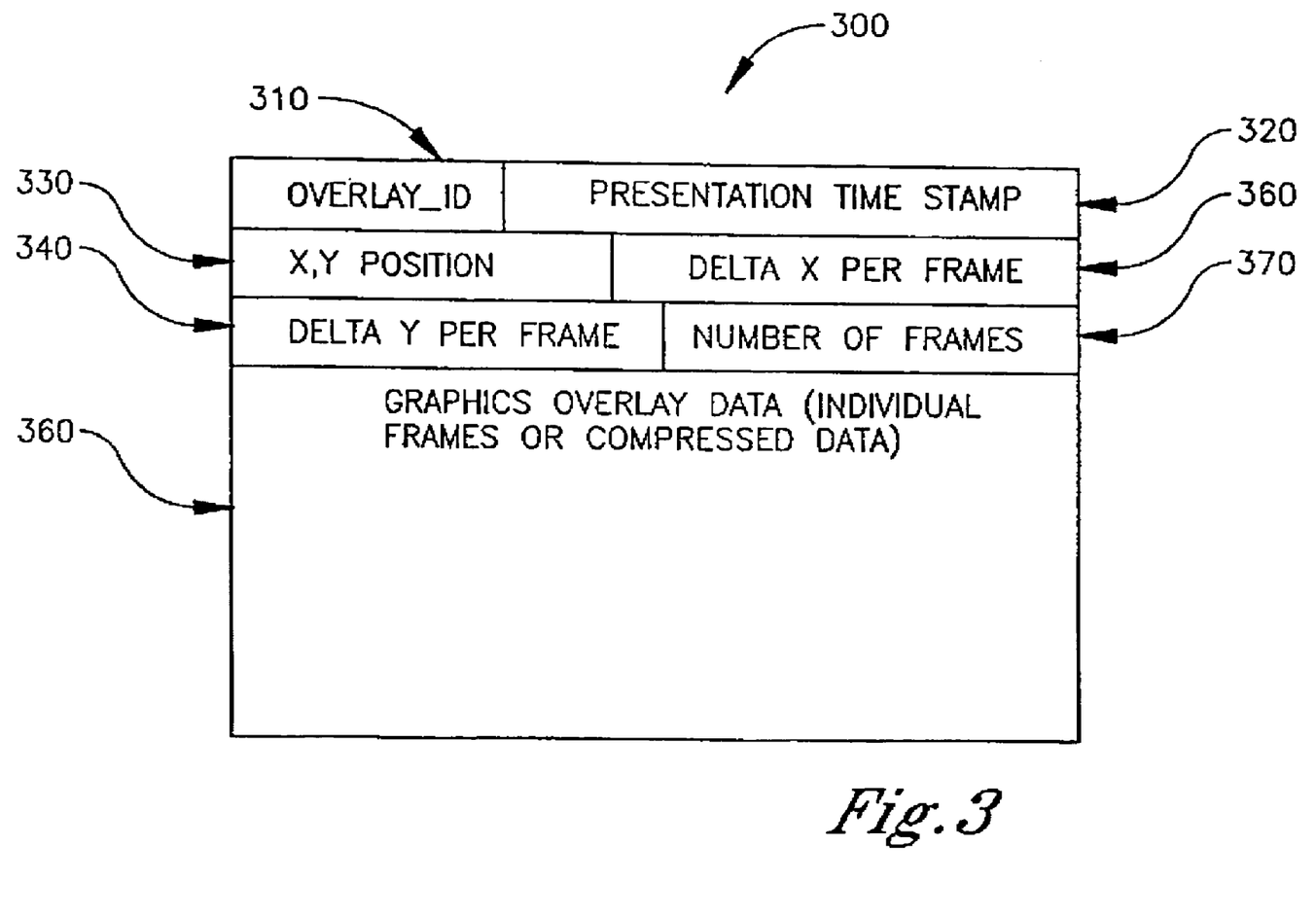
FIG. 3 is a diagram of frame information for synchronizing of the graphic content with the video plane.

FIG. 3 shows an example of an embodiment of the present invention comprising the frame identifier information necessary to specify the location over a series of video frames for synchronizing the graphics content with the displayed video. The graphic content information may be added in real time to a live presentation in progress. The frame identifier information comprises an overlay ID 310, a presentation time stamp 320, X and Y position 330, delta X per frame 360, delta Y per frame 340, number of frames 370 and graphic overlay data (individual frame or compressed data) 380. The identifying information contains the necessary information for overlaying of graphic content and audio by a properly equipped set top box "STB" or television.

Figure 4A:
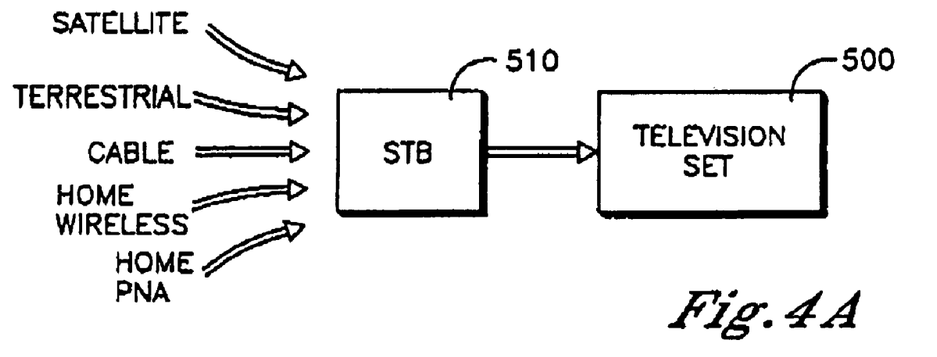
FIGS. 4a-c are system diagrams of embodiments of the equipment necessary for frame synchronization with graphic content.
Figure 4B:
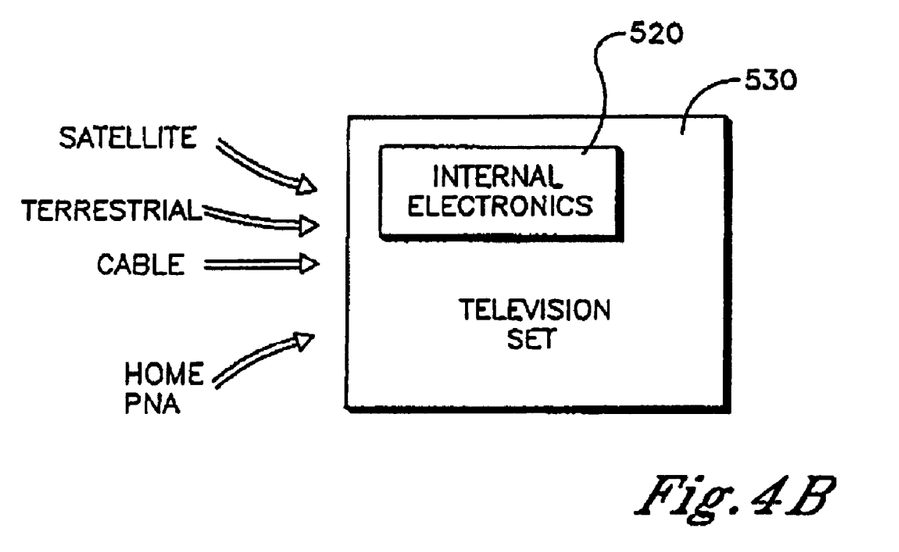

FIG. 4*a* comprises one embodiment of the typical equipment necessary for the present invention. FIG. 4*a* comprises a STB 510, a television set 500, and a multitude of input sources such as satellite, terrestrial, cable, and home wireless to receive the multimedia presentation. The STB 510 accepts and processes the multimedia presentation and passes the result to the television set 500. As an example, the STB 510 uses MPEG 2 video decoders to render the graphic content in the graphic plane which overlays the video plane. These decoders vary in sophistication by the on screen display "OSD" that they can offer. In the preferred embodiments, the video and audio decoders may be implemented together on a single chip. They may also be incorporated in other ways such as having an intermediate IC used to decode the desired analog signal formats of NTSC, PAL etc. FIG. 4*b* discloses another typical set up for the present invention, however, here the internal electronics 520 of the television set 530 are included in the requisite front end equipment for receiving and decoding the input sources.

Figure 4C:
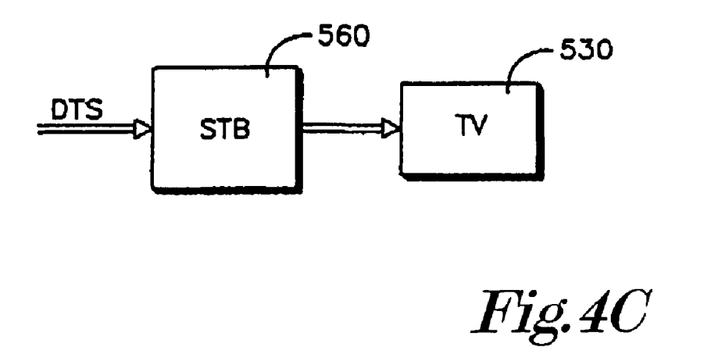

FIG. 4*c* shows a digital transport stream DTS being connected to a STB. Included in the DTS are the meta-data, electronic program guides, graphic content, television channel etc. The STB 560 receives the input from the DTS and extracts the censored video and graphic content therefrom.

Also, audio content can be inserted by a set top box audio decoder or a set top box processor and using frame synchronizing information, the audio content can be replaced with the associated frames.

Finally, the Meta-data used for synchronizing the video plane with the graphic content can be recorded to a hard drive for personal video recording along with the video content. When the video content is replayed from the hard drive the Meta-data is used as before complete the displayed video. As before, the video may be viewed in it's entirety by the user but the complete video cannot be recorded to a VCR or recordable DVD.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and statements of the scope of the invention which as a matter of language, might be said to fall there between.

I Claim:

1. A graphic censoring system, comprising:
a distributor for distributing incomplete video images and graphic data; and
a restoring device for receiving from said distributor the incomplete video images and the graphic data wherein said restoring device completes the received incomplete video images by using the received graphic data, the restoring device undertaking the act of completing received incomplete video images by displaying the incomplete video images in a video plane and displaying the graphic data in a graphics plane, thereby overlaying the graphics data on the video plane, the restoring device accessing synchronization information including a screen location at which to display the graphic data and a frame or frames of video on which to overlay the graphic data, wherein only upon payment of a fee to said distributor does said restoring device complete the received incomplete video images, wherein the graphic data overlays the video image to complete an original video distributed with at least one portion in the video image removed at a frame location, the frame location being overlaid with graphic data containing the at least one portion of video, wherein if a user wishes to view the original video, the user pays a fee to obtain a key to unlock the graphic data, whereby for copy protection, the restoring device not including the graphic data in a video output signal to a recording device such that a complete video cannot be copied to the recording device.

2. The system of claim 1, wherein said restoring device is a set top box or a television.

3. The system of claim 1, wherein said distributor is a content provider.

4. The system of claim 1, wherein said restoring device overlaying graphic data on the distributed incomplete video images.

5. The system of claim 4, wherein the said graphic data to display is pixel data associated with motion vector data from MPEG video.

6. The system of claim 1, wherein said graphic data comprising frame synchronizing information for correlating said graphic data with said incomplete video images.

7. The system of claim 6, wherein said frame synchronizing information being frame starting identifier data, frame ending identifier and position data for describing frame locations, and frame timings.

8. The system of claim 6, wherein said frame synchronizing information includes an identifier for audio insertions.

9. The method of claim 1 wherein the graphic data is received from said distributor.

10. The method of claim 1, wherein the graphic data is generated by the restoring device.

11. The method of claim 1, wherein said graphic data is stored in said receiving device for subsequent playback with the video images.

12. The method of claim 1, wherein said synchronizing information is determined prior to being conveyed to said restoring device.

13. The method of claim 12, wherein part of or all of said graphic data which is received by said restoring device is overlaid upon said video plane.

14. The method of claim 12, wherein said synchronization information data is determined by a content provider.

15. The method of claim 12, wherein said graphic data being stored in said restoring device.

16. The method of claim 12, wherein said overlaying step automatically defining based on a user's age.

17. The method of claim 1, wherein said synchronizing information includes an identifier for audio insertions.

18. The method of claim 17, wherein said graphic data being subject to change to overlay more of or less of said video plane.

19. The method of claim 17, wherein said overlaying of said graphic data being selectable by a user allowing viewing preferences.

20. The method of claim 1, wherein said synchronizing information includes an identifier for video insertions.

21. The method of claim 1, wherein said synchronizing information includes data for coordination with audio, video, and graphic information from said restoring device forming a multimedia type presentation for displaying on a display device.

22. A method for unblocking parts of a displayed presentation from a video signal using graphic content rendered by a receiving device, the method comprising:
   receiving graphic content related to said video signal, said graphic content including frame synchronizing information comprising frame starting identifier data, frame ending identifier data, for describing frame locations, and frame timings from said graphic contents, the starting and ending identifier data representing a portion of video in a completed video removed from the video signal;
   obtaining graphic, video and audio information from said graphic content by said receiving device; and
   overlaying the obtained graphic, video, and audio information of said graphic content between said frame starting identifier and said frame ending identifier in accordance with said frame synchronizing information to thereby generate the completed video, wherein the completed video is not viewable without at least the graphic content overlaid on the frame locations identified by the frame starting identifier and said frame ending identifier.

23. A method of uncensoring a display by overlaying graphic content on a video plane, said method comprising:
   receiving graphic content within a receiving device and communicating said graphic content to a graphic plane;
   receiving frame synchronizing data from said graphic content, said frame synchronizing data comprising frame identifier data, motion vector specifications for describing frame locations, and starting and ending frame coordinate data; and
   using said frame synchronizing data for overlaying said graphic content onto said video plane so as to complete a portion of said video plane to have a completed video plane by a user wherein said completed video plane being defined by the frame identifier data, motion vector specifications, and starting and ending frame coordinate data, wherein upon payment of a fee said overlaying act is executed.

* * * * *